INVENTORS.
RICHARD V. BAUM
ROSS E. GRAVES
BY
ATTORNEY

Jan. 4, 1966   R. V. BAUM ETAL   3,228,028
SIMULTANEOUS BUILDUP DOPPLER RADAR
Filed Sept. 17, 1959   6 Sheets-Sheet 2

INVENTORS.
RICHARD V. BAUM
BY ROSS E. GRAVES

ATTORNEY

FIG.-5

Jan. 4, 1966  R. V. BAUM ET AL  3,228,028
SIMULTANEOUS BUILDUP DOPPLER RADAR
Filed Sept. 17, 1959  6 Sheets-Sheet 4

INVENTORS.
RICHARD V. BAUM
BY ROSS E. GRAVES
ATTORNEY

Jan. 4, 1966       R. V. BAUM ETAL       3,228,028
SIMULTANEOUS BUILDUP DOPPLER RADAR
Filed Sept. 17, 1959                     6 Sheets-Sheet 5

STORAGE DEVICE NO. 1      STORAGE DEVICE NO. 2

RANGE
INCREMENT

L  $\cos(2\pi f_L t + \alpha_L)$     $\sin(2\pi f_L t + \alpha_L)$

T  $\cos(-2\pi f_T t + \alpha_T)$    $\sin(-2\pi f_T t + \alpha_T)$

S  $\cos(\alpha_S)$                 $\sin(\alpha_S)$

K  $\cos(2\pi f_K t + \alpha_K)$    $\sin(2\pi f_K t + \alpha_K)$

U  $\cos(-2\pi f_U t + \alpha_U)$   $\sin(-2\pi f_U t + \alpha_U)$

FIG.-7

INVENTORS.
RICHARD V. BAUM
BY  ROSS E. GRAVES

ATTORNEY

United States Patent Office 3,228,028
Patented Jan. 4, 1966

3,228,028
SIMULTANEOUS BUILDUP DOPPLER RADAR
Richard V. Baum, Phoenix, Ariz., and Ross E. Graves,
Pacific Palisades, Calif., assignors to Goodyear Aerospace Corporation, a corporation of Delaware
Filed Sept. 17, 1959, Ser. No. 841,920
8 Claims. (Cl. 343—9)

This invention relates to terrain mapping radars borne by moving objects; for example, an airplane, and makes use of the Doppler frequency shift phenomenon to obtain angular resolution, i.e., scanning in azimuth, and, more particularly, to data processing apparatus for such radars that will continuously display a complete section of terrain.

A radar of this type is diclosed and claimed in the copending application of Carl Wiley, entitled "Pulsed Doppler Radar Methods and Apparatus," filed August 13, 1954, and bearing Serial No. 449,559, now Patent No. 3,196,436.

It is the general object of the invention to improve upon radars of the air borne Doppler type by providing a continuous display, by reduction of weight and space requirements, by reduction in cost, and by improvement in simplicity.

Another object of the invention is the provision in a radar of the type described of an improved data processing system which produces a display of a complete terrain sector using primarily passive filters instead of active circuit components filters.

Another object of this invention is to provide a system, not dependent on a changing reference frequency, for distinguishing between the fore and aft azimuth lines which have the same magnitude of Doppler frequency shift but where the fore azimuth line shift is positive and the aft azimuth line shift is negative.

The foregoing objects of the invention, and other objects which will become apparent as the description proceeds, are achieved by the provision of apparatus for obtaining a picture of terrain over which an aircraft is flying which includes means for sending out isotropically a radar pulse to illuminate terrain to one side of the aircraft, means for picking up the returns from scatterers in the terrain, means for separating the returns into two sets separated in phase, separate means for synchronously demodulating each set of returns against a reference frequency, separate means for storing on a line the output of the synchronous demodulating means, the stored output comprising separate pulses separated in range along the line but mixed so far as Doppler shift characteristics are concerned, means triggering the repetition of the foregoing for $n$ radar pulses to substantially fill the two separate storage means with a series of range separated pulses on parallel storage lines, a separate means for reading out each storage means at right angles to the direction of storage and beginning at the shortest range, a CRT having sweeps progressively increasing in range with each readout sweep, means connected to the output of both readout means and connecting to the CRT for separating the stored pulses in azimuth in response to Doppler shift and for painting scatterers at the sweep range and in proper azimuth on the CRT, and means initiating the storage line by line of a second set of return information from a second series of $n$ radar pulses on each storage means and at right angles to the first set of return information, said second set of information being stored line by line as soon as each line of the storage means is cleared by the reading out means.

For a better understanding of the invention reference should be had to the drawings wherein.

It should be understood that the present invention is an improvement upon the data processing and displaying methods and apparatus of the Doppler radar disclosed and claimed in the aforementioned Wiley patent application so that the coherent radar section and the ground speed response control section therein given need not be here repeated in detail. Suffice it to say, and having reference to FIG. 1, that the present invention sends out isotropically by antenna A a microsecond pulse of short duration from transmitter ATR, for example, one or two microseconds, and illuminating terrain to only one side of the airplane 1 (see FIG. 3), called terrain B, and then listens with receiver TR for reflections from the scatterers on the terrain, such as scatterers L, K, S, T and U shown in FIG. 3. The listening period, as is well understood, is normally dependent upon the range of the scatters illuminated, and may typically be 2,000 microseconds with conventional non-Doppler radars before the next pulse is transmitted by the radar. However, as set forth in the Wiley application, the pulse repetition frequency of the present Doppler type radar is normally coordinated with the ground speed of the aircraft so that the spectrum around any harmonic of the PRF is just wide enough to meet but not overlap the spectrum around the adjacent harmonics in order to fill the scatterer reflection or return spectrum with unambiguous scatterer return information.

Figure 1:
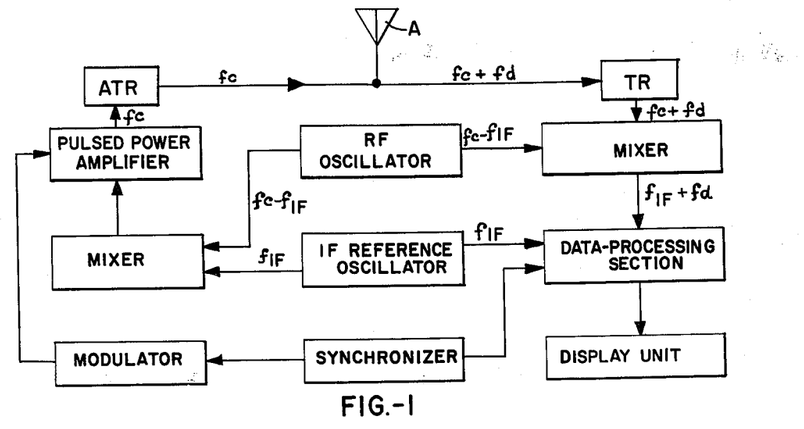
FIG. 1 illustrates in box diagram form the general arrangement of the apparatus of the invention.

Accordingly, the present invention will be described in detail only from the radar return at the I.-F. amplifier marked "Data Processing Section" of FIG. 1.

Figure 2:
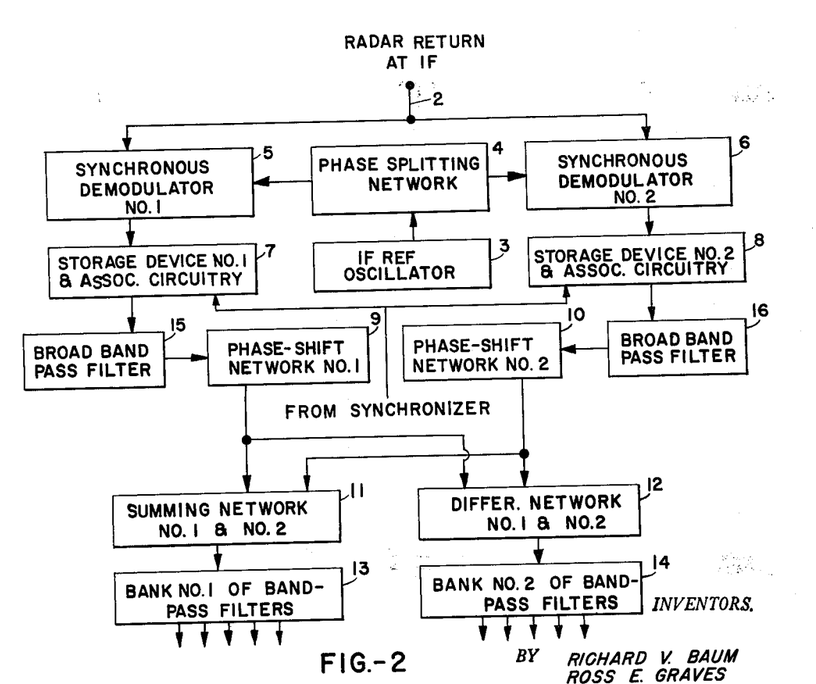
FIG. 2 shows a schematic block diagram of the data processing section of the invention.
Figure 3:
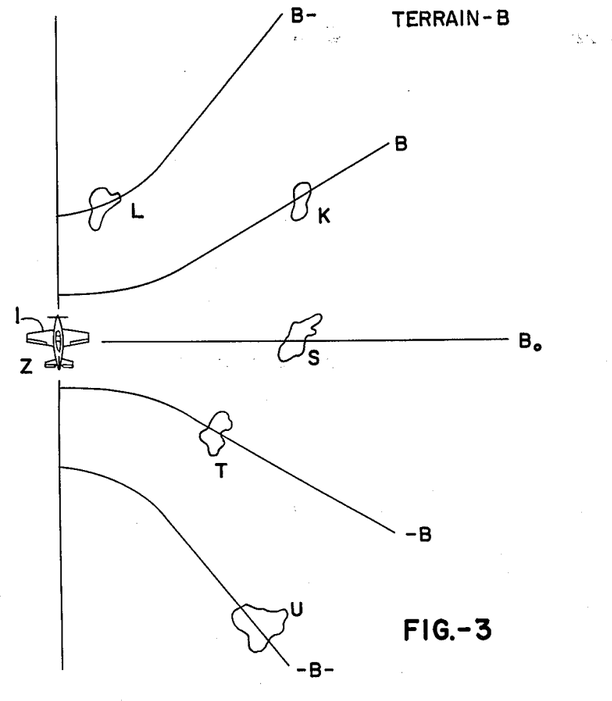
FIG. 3 is a diagrammatic plan illustration of the intersection of five Doppler cones with the terrain on one side or hand, marked Terrain B, of an aircraft and providing scatterers of positive, negative and zero Doppler shift.

Having reference to FIG. 2 of the drawings, the frequency at the output 2 of the I.-F. amplifier due to the return from a single target or scatterer is $(f_{IF}+f_d)$ where $f_{IF}$ if the I.-F. frequency and $f_d$ is the Doppler frequency shift due to that single target and this shift will be either positive, zero, or negative, depending on whether the target lies ahead of, on, or behind the zero Doppler shift line which is at right angles to the aircraft and is shown by line $B_0$ in FIG. 3. The return from the individual target will, of course, be a pulse having the frequency described. The amplitude of the pulse will depend on the size of the target and its effectiveness as a reflector.

For the group of targets or scatterers shown in FIG. 3, there will be a return pulse for each target after each pulse transmission of the radar transmitter. These return pulses will be separated in time by an amount proportional to their individual ranges and each pulse will have a positive, negative or zero frequency shift dependent on the Doppler cone line that intersects it. These frequencies for targets L, K, S, T and U would be, respectively $$(f_{IF}+f_L), (f_{IF}+f_K), (f_{IF}), (f_{IF}-f_T) \text{ and } (f_{IF}-f_U)$$

where $f_L$, $f_K$, $f_T$ and $f_U$ are the magnitude of the Doppler frequency shifts of targets L, K, T and U. Since targets T and U are behind the zero Doppler line, they have a negative Doppler shift. Targets L and U are on fore and aft Doppler cones with the same magnitude of frequency shift. This means that $f_L = f_U$. Similarly, $f_K = f_T$. Target S is on the zero Doppler frequency shift cone and therefore the return from this target has a frequency equal to the I.-F. frequency at the output of the I.-F. amplifier.

Figure 4:
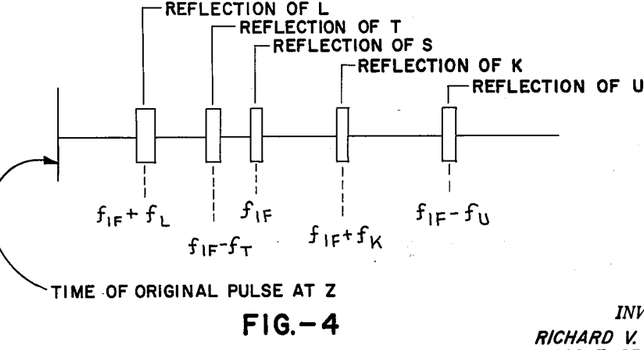
FIG. 4 is a diagrammatic view illustrating the reflections from the scatterers of terrain B as they appear at the output of the I.-F. amplifier.

FIG. 4 illustrates the return pulses reflected from the targets shown in FIG. 3 due to one transmitted pulse of the radar transmitter. Only the envelope of the returns is shown but each pulse has the frequency indicated in the drawing.

For a given target whose reflected pulse has the frequency ($f_{IF}+f_d$), the I.-F. amplifier output wave form, within this pulse, can be represented by the equation $$\cos\{2\pi(f_{IF}+f_d)t+\alpha\}$$

where $t$ is some arbitrary time since the wave form is considered to have originated and $\alpha$ is a random phase angle depending on the time it takes for the reflected pulse to return from the target.

For the specific targets L, K, S, T and U, shown in FIG. 3, the respective wave forms within the pulse envelopes will then be $$\cos\{2\pi(f_{IF}+f_L)t+\alpha_L\}, \cos\{2\pi(f_{IF}+f_K)t+\alpha_K\}$$
$$\cos\{2\pi f_{IF}t+\alpha_S\}, \cos\{2\pi(f_{IF}-f_T)t+\alpha_T\} \text{ and }$$
$$\cos\{2\pi(f_{IF}-f_U)t+\alpha_U\} \text{ where } \alpha_L, \alpha_K, \alpha_S, \alpha_T \text{ and } \alpha_U$$

are the different phase angles associated with the targets L, K, S, T and U.

The wave form at the output of the conventional I.-F. reference oscillator 3 can be represented by the equation $$\cos(2\pi f_{IF}t+\pi/4)$$

This output is fed to phase splitting network 4 which produces two signals. One, shifted in phase by an amount $-\pi/4$ is fed to a synchronous demodulator (No. 1), indicated by the numeral 5, and the other, shifted in phase by an amount $+\pi/4$ is fed to a second synchronous demodulator (No. 2), indicated by numeral 6 (see FIG. 2). These wave forms can then be represented by equations $\cos(2\pi f_{IF}t)$ and $\cos(2\pi f_{IF}t+\pi/2)$, respectively. In other words, the wave forms are identical but differ in phase by $\pi/2$ radians or 90 degrees. The phase splitting network 4 is a conventional circuit well known to those versed in the art and need not be discussed in detail here. It can be accomplished with conventional, passive, lead and lag networks as described in any comprehensive servomechanisms text such as "Principles of Servomechanisms" by G. S. Brown and D. P. Campbell, published by Wiley & Sons.

The two synchronous demodulators 5 and 6 are devices which compare an input signal with a reference signal to produce an output which is proportional to the amplitude of the input signal and the cosine of the difference in phase angle between the input signal and the reference signal. Again, these are relatively conventional circuits and will not be described in detail. A typical synchronous demodulator is shown in "Theory of Servomechanisms," volume 25, Radiation Laboratory Series, published by McGraw-Hill, p. 112. (Therein called a phase sensitive detector.)

Before discussing the effects due to the specific targets shown in FIG. 3, the case of a single target will be considered. As previously explained, the wave form at the output of the I.-F., amplifier, due to a given target with Doppler frequency shift $f_d$ and random phase angle $\alpha$, will be $\cos\{2\pi(f_{IF}+f_d)t+\alpha\}$. This wave form is amplitude modulated by a pulse envelope equal in size to that of the pulse reflected from the given target. Synchronous demodulator No. 1 will compare this signal with the reference signal from the phase splitting network having a wave form given by $\cos(2\pi f_{IF}t)$. The difference in phase angle between these two signals is $(2\pi f_d t+\alpha)$. Thus, from the input to the output of the synchronous demodulator the return from the target has been transformed from a wave of form $\cos\{2\pi(f_{IF}+f_d)t+\alpha\}$ modulated by a pulse envelope to a simple pulse of amplitude $\cos(2\pi f_d t+\alpha)$. Similarly, for synchronous demodulator No. 2, the target will result in a simple output pulse of amplitude $\cos(2\pi f_d t+\alpha-\pi/2)$ which, of course, is equal to $\sin(2\pi f_d t+\alpha)$.

Looking now at the results due to the specific targets L, K, S, T and U shown in terrain B, the output of synchronous demodulator No. 1 will be five simple pulses having the respective amplitudes $\cos(2\pi f_L t+\alpha_L)$, $\cos(2\pi f_K t+\alpha_K)$, $\cos(\alpha_S)$, $\cos(-2\pi f_T+\alpha_T)$ and $\cos(-2\pi f_U+\alpha_U)$. These pulse amplitudes can have any value from $+1$ to $-1$ depending on the value of their respective random phase angles, $\alpha_L$, $\alpha_K$, $\alpha_S$, $\alpha_T$ and $\alpha_U$.

Figure 5:
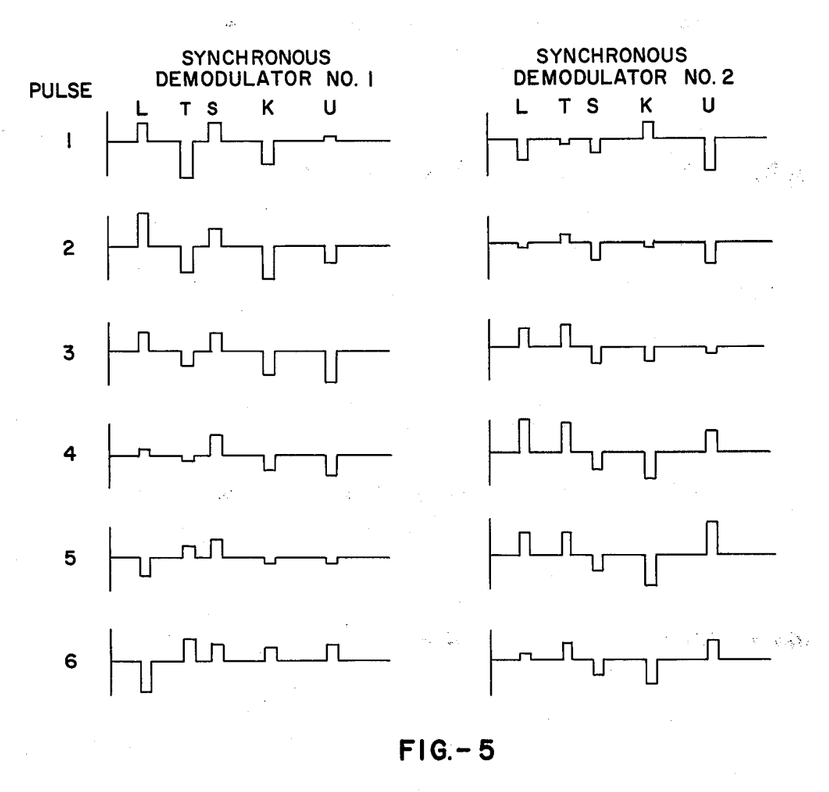
FIG. 5 shows the outputs of synchronous demodulators numbers 1 and 2 for the scatterer reflections of six pulses from the radar transmitter.

A typical set of these 5 pulses, as a result of one radar transmission pulse, is labeled pulse No. 1 and shown under synchronous demodulator No. 1 heading in FIG. 5. As a result of each additional radar transmitter pulse, a new set of five pulses is produced at the output of synchronous demodulator No. 1. In FIG. 5 six sets of five pulses each are shown indicating the output at demodulator No. 1 and demodulator No. 2 of the returns from scatterers L, K, S, T, and U with respect to six successive radar transmitter pulses.

For the time being consider only the output pulse due to the closest target, L. Its amplitude for the first transmitter pulse is $\cos(2\pi f_L t+\alpha_L)$ assuming an input signal amplitude of unity for simplicity, although it will be apparent that in the general case, such amplitude will not be unity. As a result of the second radar transmission its output pulse will have an amplitude of $$\cos\{2\pi f_L(t+\tau)+\alpha_L\}$$

where $\tau$ is the length of time between radar transmissions. Thus, after each radar transmission there will be a change in amplitude of the demodulator output pulse due to target L. This progressive change of amplitude of target L is shown in FIG. 5 for six subsequent radar transmissions.

Simultaneously, of course, the target return pulses shown in FIG. 5 of targets K, T, and U are also changing in amplitude for each subsequent radar tranmission. Target S is the only exception. Since it lies on the zero Doppler cone for a considerable number of radar transmissions its amplitude is unaffected by any Doppler frequency shift and is equal to $\cos(\alpha_S)$. Since $\alpha_S$ does not change appreciably between radar transmissions, the amplitude of the pulses of FIG. 4 for target S stays constant for each subsequent pulse. Thus, after each radar transmission, simple pulses representing targets L, K, S, T and U appear at the output of synchronous demodulator No. 1. For all the pulses except S their amplitudes vary at a rate determined by their respective Doppler frequency shifts. The results for six subsequent radar transmissions are shown under the synchronous demodulator No. 1 heading in FIG. 5. As indicated, the greater the Doppler frequency shift, the faster the rate of change of pulse amplitude.

This is shown in greater detail by a comparison, for example, of return pulse L running down through the six radar pulses shown in FIG. 5. At pulse 1 the return pulse L has not yet quite reached maximum. At pulse 2 pulse L is about at maximum. At pulse 3 pulse L has dropped to slightly less than it was at pulse 1. At pulse 4 pulse L is almost zero. At pulse 5 pulse L is well into negative. On the other hand, looking at the returns from target K (on a lesser Doppler shift cone) at pulse 1 the return pulse K is approaching a negative maximum about like return pulse L at pulse 1 is approaching a positive maximum. At pulse 2 pulse K is about a negative maximum. At pulse 3 pulse K is about back where it was on pulse 1. At pulse 4 pulse K is about half-way towards zero. At pulse 5 pulse K is still not to zero. But at pulse 5 pulse L was well through zero. In other words, the returns from target L towards a maximum Doppler shift are showing a higher frequency variation than target K at a lesser Doppler shift.

The readout from the storage tubes 7 show the same differences in Doppler shift.

In an exactly similar manner a set of five pulses are produced at the output of synchronous demodulator No. 2 (see FIG. 5) for each subsequent radar transmission. However, the amplitudes of these pulses vary as a sine function instead of a cosine function so that the changes in amplitude of subsequent sets of pulses are $\pi/2$ radians different in phase from that of their counterparts at the output of synchronous demodulator No. 1.

Figure 6:
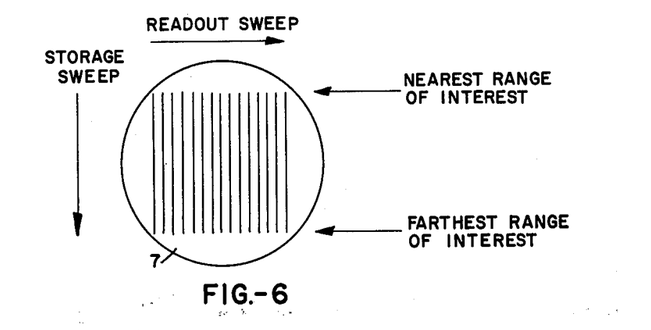
FIG. 6 shows diagrammatically a storage surface prior to beginning of readout cycle.

The output of synchronous demodulator No. 1 is fed to storage device No. 1, marked 7, in practice usually a storage tube, for example several of the Radechon types have proven satisfactory. The returns resulting from the first radar transmission are stored on the first left hand vertical line shown in FIG. 6. The output, beginning with the nearest range of interest at the top, is progressively stored on this line as the storage sweep moves down. This continues until the farthest range of interest has been reached at the bottom end of the line. For targets L, K, S, T and U, the information stored on this first line corresponds to that shown on pulse No. 1 sweep in FIG. 5. Similarly, the information stored on the next vertical line corresponds to that represented by the pulse No. 2 sweep shown in FIG. 5, etc. Thus, for $n$ subsequent radar transmission, $n$ subsequent sets of pulses are stored on $n$ vertical lines. The number $n$ is somewhat arbitrary but should be as large as possible since, as will be explained later, the angular resolution between targets improves as $n$ increases for a fixed radar PRF. On the other hand, $n$ must be small enough so that the distance moved by the aircraft during the time required for $n$ pulses is not large enough to appreciably effect the values of the Doppler shift frequencies. In practice a value for $n$ in the neighborhood of 64 has been found to be satisfactory.

After storage of the return from the $n$th pulse and prior to the beginning of storage of the return from the $n + 1$st pulse, the stored information corresponding to the nearest resolvable range increment of interest is read out (see FIG. 6) by sweeping the reading beam horizontally across the $n$ line of stored information. The reading beam is then stepped down by an amount equal to the smallest resolvable range increment and again swept horizontally across the $n$ lines of stored information. The number of readout sweeps before the beginning of storage of information from the $n+1$st pulse will depend on the ratio of the number of resolvable range increments to $n$. Reading out this desired number of sweeps erases the stored charge, leaving a horizontal strip cleared for storage of the return from the $n+1$st sweep. Thereafter as each readout sweep clears a new horizontal space the information from the return of the next radar pulse is stored on the cleared space.

The above process is continued until, after the 2 $n$th pulse, all the information stored in the vertical lines has been read out, and $n$ lines of horizontal stored information are ready for processing. This information is due to the second set of $n$ pulses. The sweep directions are now interchanged and the information on these $n$ horizontal lines is read out and another set of $n$ vertical lines of stored information is available. This sequence of operations is continued indefinitely. This method has the advantage of always keeping the storage surface essentially full of stored signals, thus avoiding the need for a greater number of storage devices.

Figure 7:
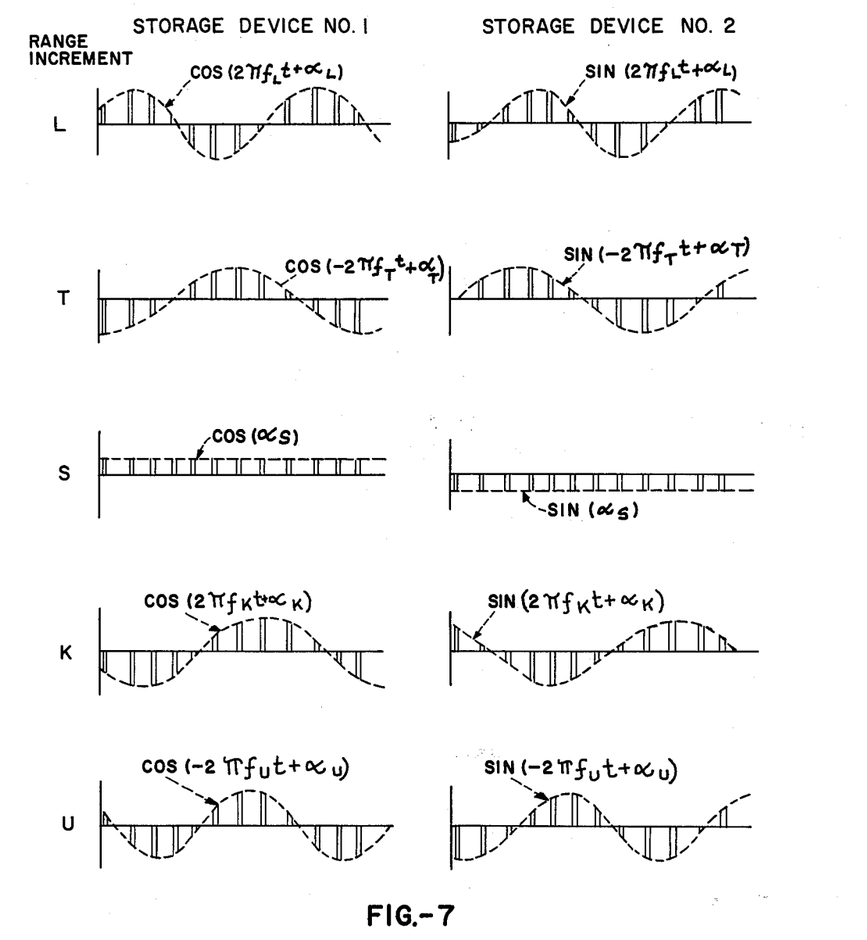
FIG. 7 shows the outputs of storage devices numbers 1 and 2 at range increments corresponding to the range of scatterers or targets L, T, S, K and U.

Consider now the signal produced due to the horizontal readout sweep at a range equal to that of the nearest target L, shown in FIG. 3. This signal will consist of a train of $n$ pulses. Assume, temporarily, that the velocity of the readout sweep is such that these pulses occur with frequency equal to PRF. The amplitude of the first six of these pulses will correspond to the amplitudes of the six L pulses shown under the synchronous demodulator No. 1 heading in FIG. 5. A diagrammatic plot of the output signal of storage device No. 1 for this horizontal sweep at the range increment of target L is shown in FIG. 7. As explained previously, the amplitude of each pulse due to target L is determined by the equation $\cos(2\pi f_L t + \alpha_L)$. As also explained previously, this means that the time between pulses results in a change of amplitude of each subsequent pulse. As shown in the figure, this results in a series of pulses from target L modulated in amplitude by the wave form $\cos(2\pi f_L t + \alpha_L)$.

Also, the wave forms of FIG. 7 for the output of the storage device 7 indicates a difference in frequency between the several targets still representative of the difference in Doppler shift of the targets so that the several wave forms can be separated in azimuth by means of filters and time delay line as hereinafter described.

Simultaneously, an exactly similar storing and reading out process has been going on in storage device No. 2. Thus the output signal of storage device No. 2 for the horizontal readout sweep at the range increment of target L is a similar set of pulses. However, the amplitude of each of these pulses is determined by the equation $\sin(2\pi f_L t + \alpha_L)$ so that the result is a series of pulses modulated in amplitude by this wave form. This series of pulses due to the readout sweep at the range increment of target L is shown under the storage device No. 2 heading of FIG. 7. Here, again, the amplitude of the first six of these pulses correspond to the amplitudes of the six L pulses shown under the synchronous demodulator No. 2 heading in FIG. 5.

FIG. 7 shows the signals from both storage devices for all the targets on terrain B, due to readout sweeps at their respectively range increments. The frequencies of the amplitude modulation wave forms are the same as the Doppler shift frequencies if (as was temporarily assumed) the readout sweeps produce pulses having the same frequency as the PRF. Thus the targets L and U with the greatest Doppler frequency shift vary in amplitude at a faster rate than do the amplitudes of targets T and K. Target S is on the zero doppler line and does not vary in amplitude. These differences in amplitude effects are apparent from FIG. 7.

Thus far the effects due to the six specific targets on terrain B have been considered. It will be simpler in the discussion to follow to consider the effect due to the return signals from a single general target at an arbitrary range and with Doppler frequency shift $f_d$. Since the system is linear the output of the storage devices due to a set of targets is essentially the summation of the outputs corresponding to the individual targets and there is thus no loss in generality in treating the case of a single target. The more general and more practical situation where the readout pulse frequency is different from the PRF will also be introduced.

Figure 8:
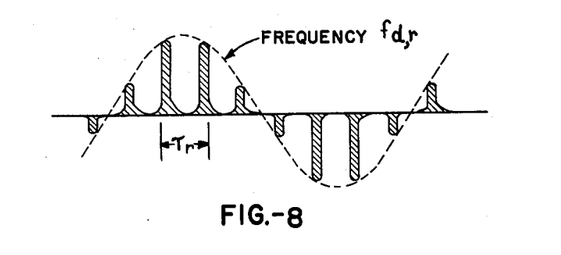
FIG. 8 shows output of storage device due to a single scatterer at a given range increment.

The stored information at the range increment of this general target, when read out of the storage device, will produce a signal consisting of a train of pulses. The rate at which the reading beam is swept across the $n$ lines of stored video information is, in general, a constant independent of the PRF. If the time required for the reading beam to sweep from one line of stored information to the next is $\tau_r$, then the apparent repetition frequency at the output of the storage device will be given by $F_r = 1/\tau_r$. It is desired that the amplitude of these pulses should vary sinusoidally with frequency $f_{d,r}$, where $f_{d,r}$ has the same ratio to the Doppler shift $f_d$ that $F_r$ has to the radar PRF. This will be true if the shapes of the pulses read out of the storage device are essentially uniform. If this is not true, then it will be necessary to reshape them by reading each pulse out into an integrating capacitor which is discharged through a resistance after all the charge on the storage surface corresponding to a given line and a given range increment has been transferred to the capacitor. The pulses thus generated will all have the same shape, but will have amplitudes proportional to the amplitudes of the signals stored in the storage device. The output of the storage device due to a single target at a given range increment is shown in FIG. 8.

Since the readout rate, and hence $F_r$, is held constant, the apparent Doppler frequency $f_{d,r}$ depends only upon the radar scatterer geometry and is independent of the PRF which varies with the vehicle velocity as described in the aforesaid Wiley application. This means that the output of any given one of the bandpass filters always corresponds to the same azimuthal direction independently of the vehicle velocity.

From the standpoint of frequency analysis, the output of the storage device due to a single scatterer can be described as a train of pulses of frequency $F_r$ modulated by the sinusoidal frequency $|f_{d,r}|$. If this pulse train were infinite, the spectrum of the output would consist of a sequence of discrete lines at the frequencies $|f_{d,r}|$, $$kF_r \pm |f_{d,r}| \quad (k=1, 2 \ldots)$$

but since the train is actually made up of only $n$ pulses, the actual spectrum will be continuous and will consist of narrow bands centered at these frequencies together with a series of side lobes between these bands.

Figure 9:
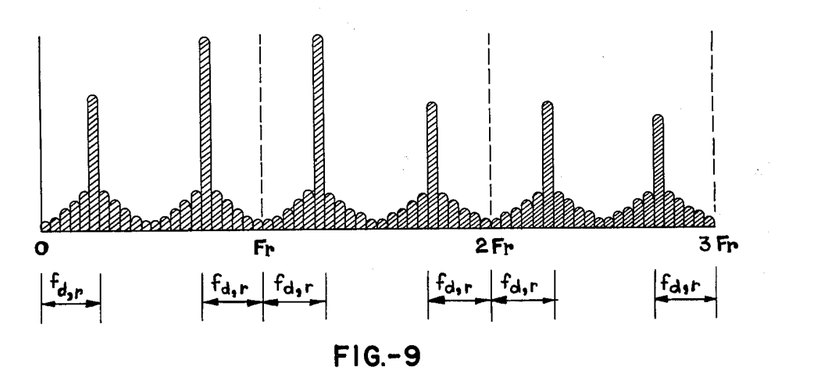
FIG. 9 shows spectrum of storage device output due to a single scatterer.

FIG. 9 illustrates the general features of this spectrum. The effect of the weighting, as described in the Wiley application, is to decrease the amplitude of the side lobes at the expense of a slight broadening of the main bands. This PRF is coordinated with the vehicle velocity so that the magnitude of the Doppler shift $f_d$ is always $\leq F/2$, where F is the PRF of the radar. Due to the scaled up readout rate from the storage device this means the apparent Doppler shift $|f_{d,r}|$ is always $\leq F_r/2$, where $F_r$ is the apparent PRF. It is obvious from FIG. 9 that this is a necessary condition for an unambiguous spectral analysis. Thus, a narrow band filter can be used to separate the return from a given scatterer from all other scatterers at the same range which give rise to different Doppler frequencies. A bank of bandpass filters, as hereinafter described, covering a frequency range $f$ can be used to split the radar return from a given range increment into a number of channels. It is necessary that $f$ be restricted so that $aF_r - \frac{1}{2}F_r \leq f \leq aF_r$, or $aF_r \leq f \leq aF_r + \frac{1}{2}F_r$ where $a$ is an arbitrarily chosen integer. Each of these filters will pass only energy from scatterers whose Doppler frequencies, and therefore azimuthal directions, lie in the specified narrow region.

Since the spectrum consists of a series of continuous bands rather than discrete lines, no set of band-pass filters, however narrow, can analyze the Doppler spectrum of the radar return into components narrower than the width of these bands. The spectrum analyzer must process the information from successive range increments in rapid sequence, which means the filter bank must have some provision for "forgetting" the information stored in the individual filters. That is, the memories of the band-pass filters must be sufficiently short so that the information read out of the filter bank corresponds almost entirely to the output of the storage device on the last readout sweep. Any residual information from other range increments should be in the neighborhood of 30 db down.

There are two possible ways of satisfying this requirement. One possibility is to damp the filters after they have read and before they have received information from the storage device corresponding to the next range increment. The other solution to the problem is to make the filter band width sufficiently wide so that by the time the band-pass filters are read, the information corresponding to all but the last range increment read out of the storage device has had a chance to decay sufficiently.

In this last method the band widths of the filters should be broad to permit the stored information to decay sufficiently but they should be narrow in order to effect near optimum analysis of the Doppler spectrum. Fortunately, the frequency spectrum is a function of the time between sweeps. Thus, it is only necessary to raise the velocity of the readout sweep to the point where the filter band widths are broad enough to permit the required decay rate, at the same time keeping the ratio of the filter band widths to the widths of the spectral bands sufficiently small to effect near optimum analysis of the Doppler spectrum.

The previous discussion is based on the readout rate being constant and on the spacing between the $n$ lines of stored information being uniform. There are various methods that could be used to accomplish this and it should be emphasized that successful operation of the system is not restricted to the use of any given one. However, it is worthwhile to discuss one of these methods in order to indicate how it is integrated into the system. Counter-controlled digital deflection circuits can be used for both the horizontal and vertical sweeps of the storage tubes 7 and 8. The counters for one set of sweeps will be triggered by the radar PRF, while those for the other set of sweeps will be triggered by the shaped output of a crystal oscillator of frequency $F_r$. The directions of the writing and reading sweeps on alternate storage tube cycles can be interchanged by switching the inputs to the two sets of counters. For horizontal (or vertical) deflections during both writing and reading the same counters and deflection circuits are used so the two sets of sweeps are automatically synchronized. From the above discussion it can be seen that the sweep, interchange, and deflection methods used are sufficiently conventional to be provided by the man skilled in the art without further explanation here.

Although not essential there are advantages to using an additional broad band-pass filter between each storage device and the filter banks hereinafter described. Such a filter, as indicated at 15 and 16, prevents energy from frequencies other than those which can be passed by the band-pass filters from reaching the filter bank. Even if the skirts on the amplitude characteristics of the band-pass filters fall off sufficiently rapidly to eliminate frequencies outside the band of interest, the preliminary filter will be desirable to avoid overdriving the band-pass filters in the filter bank.

One of the most difficult problems in designing a simultaneous build-up Doppler radar is elimination of the fore-aft Doppler ambiguity. In discussing how this is accomplished, it will be convenient to suppose initially that the outputs of the storage devices are infinite trains of pulses. The slight modification required to satisfy the actual case of only $n$ pulses will be pointed out later. As discussed previously, the spectra of the storage devices outputs will then be a sequence of discrete lines at the frequencies $|f_{d,r}|$, $kF_r \pm |f_{d,r}|$, where $k=1, 2, \ldots$ Also, it has been found necessary to limit the frequency range $f$ covered by the filter banks so that $$aF_r - \frac{1}{2}F_r \leq f \leq aF_r, \text{ or } aF_r \leq f \leq aF_r + \frac{1}{2}F_r$$

where $a$ is one of the integral values of $k$. It will greatly simplify the notation in the work to follow if $f$ is chosen so that $F_r \leq f \leq \frac{3}{2}F_r$. The modifications in the analysis necessary for the other permissible ranges of $f$ will be clear in the development that follows.

Since the entire system is linear, it will suffice to examine the operation of the radar system for the case of a single scatterer which gives rise to an apparent Doppler shift $f_{d,r}$. The information read out of storage device No. 1 will consist of a train of pulses of frequency $F_r$ modulated by $\cos(2\pi f_{d,r} t+\alpha)$, while that read out of storage device No. 2 is the same except that the modulation is $\sin(2\pi f_{d,r} t+\alpha)$. Since the PRF is synchronized with respect to the vehicle velocity in such a way that $|f_{d,r}| \leq \frac{1}{2} F_r$ and since the band-pass filters will pass only frequencies in the band $F_r \leq f \leq \frac{3}{2} F_r$, the only frequency of the storage device output which must be considered is $F_r + |f_{d,r}|$.

The modulated pulse trains which appear at the output of storage devices may be represented by the series $$F_1(t) = [\cos(2\pi f_{d,r} t+\alpha)] \sum_{K=0}^{\alpha} a_K \cos(2\pi K F_r t + \alpha_K) \quad (1)$$

for storage device No. 1 and by $$F_2(t) = [\sin(2\pi f_{d,r} t+\alpha)] \sum_{K=0}^{\alpha} a_K \cos(2\pi K F_r t + \alpha_K) \quad (2)$$

for storage device No. 2. The only components of interest in the output of storage device No. 1 arises from the term $$a_1 \cos(2\pi f_{d,r} t+\alpha) \cos(2\pi F_r t + \alpha_1)$$
$$= \tfrac{1}{2} a_1 \cos[2\pi(F_r + f_{d,r})t + \alpha_1 + \alpha]$$
$$+ \tfrac{1}{2} a_1 \cos[2\pi(F_r - f_{d,r})t + \alpha_1 - \alpha] \quad (3)$$

while the components of interest in the output of storage device No. 2 arises from the term $$a_1 \sin(2\pi f_{d,r} t+\alpha) \cos(2\pi F_r t + \alpha_1)$$
$$= \tfrac{1}{2} a_1 \sin[2\pi(F_r + f_{d,r})t + \alpha_1 + \alpha]$$
$$- \tfrac{1}{2} a_1 \sin[2\pi(F_r - f_{d,r})t + \alpha_1 - \alpha] \quad (4)$$

There are three separate cases to be considered: (1) Doppler shifts greater than zero; (2) less than zero; (3) equal to zero. Since $\tfrac{1}{2} a_1$ appears merely as a constant multiplier throughout Equations 3 and 4, it will be convenient to omit it in the case by case analysis that follows:

CASE I—DOPPLER SHIFT>0

In this case the relevant terms in Equations 3 and 4 are $\cos[2\pi(F_r + f_{d,r})t + \beta]$ (From storage device No. 1)
$\sin[2\pi(F_r + f_{d,r})t + \beta]$ (From storage device No. 2)

where $\beta = \alpha_1 + \alpha$.

After passage through the conventional phase-shift networks 9 and 10 shown in FIG. 2, and described, for example in a paper by D. K. Weaver in the Proceedings of IRE for April 1954, these signals become $\cos[2\pi(F_r + f_{d,r})t + \beta + \phi]$
(From phase-shift network No. 1)
$\sin[2(F_r + f_{d,r})t + \beta + \phi + \pi/2]$
(From phase-shift network No. 2)

where $\phi = \phi[2\pi(F_r + f_{d,r})]$, the frequency dependent phase-shift characteristics of such networks.

These signals may be rewritten as $\cos[2\pi(F_r + f_{d,r})t + \beta + \phi]$
(From phase-shift network No. 1)
$\cos[2\pi(F_r + f_{d,r})t + \beta + \phi]$
(From phase-shift network No. 2)

When combined in the simple conventional cross suming network 11 and differencing network 12, such networks being shown for example in "Electronic Analogue Computers" by Korn & Korn, published by McGraw-Hill, it follows that the only terms which can pass to the banks of band-pass filters are $2 \cos[2\pi(F_r + f_{d,r})t + \beta + \phi]$ (From summing network),
0 (From differencing network) (5)

In other words, an output is effected only from the summing network 11 to pass signals to only the positive Doppler shift filters 13.

CASE II.—DOPPLER SHIFT<0

Here examination of Equations 3 and 4 shows that the relevant terms in the outputs of the storage devices are $\cos[2\pi(F_r - f_{d,r})t + \gamma]$ (From storage device No. 1)
$-\sin[2\pi(F_r - f_{d,r})t + \gamma]$ (From storage device No. 2)

where $\gamma = \alpha_1 - \alpha$. After passage through the phase-shift networks 9 and 10 these signals become $\cos[2\pi(F_r - f_{d,r})t + \gamma + \phi]$
(From phase-shift network No. 1)
$-\sin[2\pi(F_r - f_{d,r})t + \gamma + \phi + \pi/2]$
(From phase-shift network No. 2)

which may be rewritten as $\cos[2\pi(F_r - f_{d,r})t + \gamma + \phi]$
(From phase-shift network No. 1)
$-\cos[2\pi(F_r - f_{d,r})t + \gamma + \phi]$
(From phase-shift network No. 2)

Thus, after combination in the summing network 11 and differencing network 12, the only terms which can pass to the banks of bandpass filters are given by 0 (From summing network)
$2 \cos[2\pi(F_r - f_{d,r})t + \gamma + \phi]$
(From differencing network) (6)

Thus, an output is effected only from the differencing network 12 to operate the negative Doppler shift filters 14.

CASE III.—DOPPLER SHIFT=0

In this case, reference to Equations 3 and 4 shows that the relevant terms in the outputs of the storage devices are $2 \cos \alpha \cos(2\pi F_r t + \alpha_1)$ (From storage device No. 1)
$2 \sin \alpha \cos(2\pi F_r t + \alpha_1)$ (From storage device No. 2)

Passage through the phase-shift networks 9 and 10 transforms these signals into $2 \cos \alpha \cos(2\pi F_r t + \alpha_1 + \phi)$
(From phase-shift network No. 1)
$2 \sin \alpha \cos(2\pi F_r t + \alpha_1 + \phi + \pi/2)$
(From phase-shift network No. 2)

which may be rewritten in the form $2 \cos \alpha \cos(2\pi F_r t + \alpha_1 + \phi)$
(From phase-shift network No. 1)
$-2 \sin \alpha \sin(2\pi F_r t + \alpha_1 + \phi)$
(From phase-shift network No. 2)

After combination in the summing network work 11 and differencing network 12, the only terms which can pass to the band-pass filters are the terms $2 \cos(2\pi F_r t + \beta + \phi)$ (From summing network)
$2 \cos(2\pi F_r t + \gamma + \phi)$ (From differencing network) (7)

where $\beta$ and $\gamma$ have the same meaning as in Cases I and II.

It is necessary to have the output at zero Doppler appear at at least one filter at both filter banks 13 and 14 for the reason that it is possible that the phase angle of the return from the target S at a given range may be such that the amplitude output of the demodulator No. 1 will be close to zero with respect to target S instead of having an amplitude of about half maximum as shown in FIG. 5. However, with the output of demodulator No. 2 at a 90° phase difference with respect to that of demodulator No. 1, if the phase angle of the return should be close to zero and substantially not show with respect to the output of demodulator No. 1 the output of demodulator No. 2 at 90° will show at a maximum. Or vice-versa, should the phase angle of the output of demodulator No. 2 be close to zero and substantially not show, then the output of demodulator No. 1 will be at a maximum. Of course, if the phase angle of the zero Doppler return is somewhere between zero and maximum, as seen with respect to target S in FIG. 7, then the partial output signal shows on the CRT through at least one filter at both filter banks 13 and 14.

Examination of Equations 5, 6, and 7 shows that the returns from those scatterers which give rise to positive Doppler shifts have been completely separated from the returns from scatterers which give rise to negative Doppler shifts. To be more specific, the output of filter bank No. 1, marked 13, contains all information from those scatterers which lie on that portion of the terrain ahead of the zero-Doppler frequency line. The output of filter bank No. 2, marked 14, contains all information from scatterers lying in the terrain behind the zero-Doppler line. Information from scatterers which lie upon the zero-Doppler frequency line will, in general, appear in only certain of the outputs of both filter banks 13 and 14. The Doppler frequency analysis necessary for further azimuthal discrimination is, of course, effected by the individual band-pass filters as hereinafter described.

Since the pulse train is not infinite but is made up of $n$ pulses, the spectra of the actual outputs of the storage devices, due to a single scatterer, will consist of narrow bands, centered on the hypothetical discrete lines. In addition, of course, there are the unwanted side lobes between these bands which have been substantially suppressed by the weighting function by shaping and controlling the side lobes in optimum or near-optimum condition.

The problem of designing a pair of all-pass phase-shift networks for which the differential phase-shift is 90 deg. to within any prescribed tolerance over a band has been reviewed and summarized in a paper by D. K. Weaver appearing in the April 1954 issue of Proceedings of IRE. Examination of his design curves shows that the detailed design and construction of the phase-shift networks whose steady-state characteristics meet the requirements of this system of this system is a purely routine matter.

There are several possible designs for an indicator to present the display produced by the radar processing apparatus described above. If filters with essentially infinite Q's are used, they must be damped after they have been read and before they have received information from the storage device corresponding to the next range increment. Such filters can be sampled sequentially and the outputs detected or rectified and displayed in the conventional manner. If it is preferable to avoid the additional circuits required for sequential sampling, then the filters must be interrogated simultaneously. The actual circuitry of each filter is a conventional LC tuned circuit. Suffice it to say here that a complete bank of filters are utilized tuned from the maximum doppler shift to the minimum in increments of filterable difference in the manner which will be understood. This simultaneous interrogation is the preferred practice and will now be described.

Figure 10:
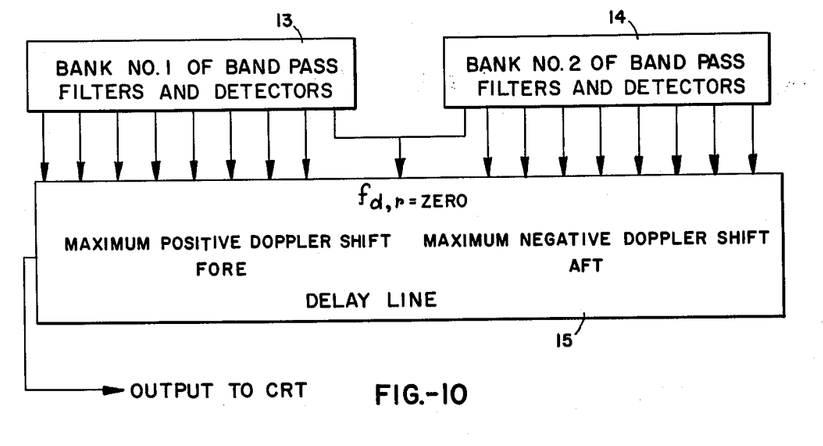
FIG. 10 shows a delay line method of producing radar display.

To provide simultaneous interrogation of filters a delay line 15 (FIG. 10) has been used in actual practice. Any commercially available conventional lumped constant delay line with satisfactory characteristics can be used. In practice one manufactured by the Digitronics Corporation of Albertson, New York, was found to be satisfactory. FIG. 10 is a diagrammatic drawing of the method used to provide the display signals fed to the CRT 16. Two banks of filters 13 and 14 are shown having their outputs coupled to a delay line 15; it being understood that normally the outputs are detected or rectified by suitable circuitry incorporated in the filter banks 13 and 14 prior to insertion into the delay line 15. The first readout sweep, at the nearest range of interest, produces at the outputs of both filter banks a variety of frequencies corresponding to the azimuth directions of the various targets at this range. The outputs of the individual filters are fed to the delay line at equally spaced intervals along its length.

In practice only targets on azimuth lines ±60° fore and aft of the zero doppler line have been displayed.

The signal from the filter whose output results from the target on the fore azimuth line producing the greatest Doppler shift is fed into the end of the delay line nearest its output. Filter signals resulting from targets on azimuth lines progressively nearer the zero doppler azimuth line are fed into the delay line at increasing distances from its output end. Similarly the signal corresponding to the target producing the most negative Doppler frequency shift is fed into the delay line at the point most distant from its output. Midway between the feed-in points for the most negative and most positive Doppler frequency signals is the feed-in point for the zero Doppler frequency signals which results from one filter in both banks.

Thus, as a result of the first readout sweep at the nearest range of interest, signals due to targets, all at this range but lying in different azimuth directions, are simultaneously fed into the delay line. However, as is well known from delay line theory, it requires a finite length of time for these signals to travel down the line and appear at the output. The signal with largest positive Doppler shift appears at the output first, then those with progressively smaller positive shifts until the zero Doppler shift signal appears. Next, the signal with the smallest negative Doppler shift appears and then subsequent negative Doppler shift signals until finally the last signal is due to the most negative doppler shift frequency. The resulting output of the delay line will be a line of video with targets at the same range but at different azimuths separated in time.

Figure 11:
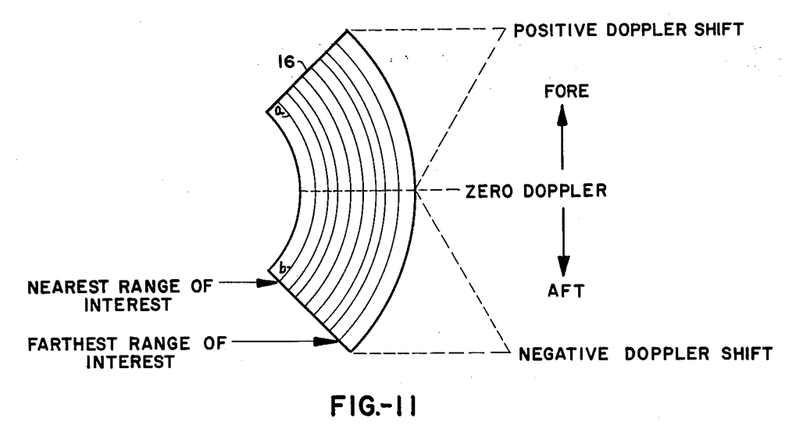
FIG. 11 shows the method of displaying terrain on a CRT.

FIG. 11 gives a diagrammatic view of the sector of the CRT 16 used to display that part of the terrain to be mapped. The CRT sweep circuitry is synchronized with the readout sweep so that the CRT spot moves along the line from $a$ to $b$ and displays the video signal produced by the delay line. Thus the target with the largest positive Doppler shift to be used, at nearest range of interest, is displayed at point $a$. Targets at other azimuth angles are displayed in proper place along line $ab$. For the readout sweep at the next range increment the CRT spot sweeps out the next circular line on the CRT. This continues until the last readout sweep, at farthest range of interest, results in the last circular line on the CRT face.

Thus, the returns of the various scatterers illuminated isotropically and differing from each other in Doppler shift and time but all mixed together, are separated in azimuth, both fore and aft, and in range and are continuously painted in proper position on the CRT display for each $n$ pulses of the radar transmitter.

While certain representative embodiments and details have been shown for the purpose of illustrating the invention, it will be apparent to those skilled in this art that various changes and modifications may be made therein without departing from the spirit or scope of the invention.

What is claimed is:

1. Apparatus for scanning terrain from a moving object, such as an aircraft, and for reproducing a picture of the terrain in the object, which includes means for sending out isotropically to illuminate terrain at one side of the object a radar pulse, means listening for the returns of the pulse from the scatterers on the terrain, phase-splitting means for converting the returns during the listening period into two sets of returns separated about 90° in phase, separate means for synchronously demodulating each set of returns against a reference frequency to produce a series of pulses varying in amplitude by the strength of the return and in frequency at rate determined by the respective Doppler shifts effected by the scatterers causing the return pulses, separate means storing the pulses of each set on a line the pulses being separated in range along the line, means effecting the repeating of the operation for $n$ radar pulses and for effecting the storing of the separate sets of return information from each radar pulse on a separate line in the separate storage means, separate means concurrently reading out the stored information by sweeping the stored lines at right angles to the direction of storage beginning at the shortest range, means separating the readout information into positive, zero, and negative Doppler shift portions, a bank of filters separated in increments of maximum to minimum positive Doppler shift and connected to the positive Doppler shift portions, a second bank of filters separated in increments of minimum to maximum negative Doppler shift and connected to the negative Doppler shift portions, one filter of each bank being responsive to zero Doppler shift and connected to the zero Doppler shift portions, a CRT having sweeps in range, a delay line connecting the output of the banks of filters to the CRT, the maximum positive Doppler shift filter being closest to the CRT and each lesser Doppler shift filter being farther from the CRT with the zero Doppler shift filters being halfway and the maximum negative Doppler shift filter being farthest away so that the first line painted on the CRT shows scatterers at a common range but separated in azimuth by the amount of Doppler shift showing up from the filter banks and delay line, and each succeeding line painted on the CRT is at a greater range until all stored information has been read out and the CRT is painted to the full range desired, and means effecting the repeating of the operation for each $n$ radar pulses and effecting the beginning of storage at right angles to the previous storage on each storage means as each previous line of stored information is read out.

2. Apparatus for scanning terrain from a moving object, such as an aircraft, and for reproducing a picture of the terrain in the object, which includes means for sending out isotropically to illuminate terrain at one side of the object a radar pulse, means listening for the returns of the pulse from the scatterers on the terrain, phase-splitting means for converting the returns during the listening period into two sets of returns different in phase, separate means connected to the output of each set of phase differing returns for producing a series of pulses varying in amplitude by the strength of the return and in frequency at rate determined by the respective Doppler shifts effected by the scatterers causing the return pulses, separate means storing the pulses of each set on a line the pulses being separated in range along the line, means effecting the repeating of the operation for $n$ radar pulses and for effecting the storing of the separate sets of return information from each radar pulse on a separate line in the separate storage means, separate means concurrently reading out the stored information by sweeping the stored lines at right angles to the direction of storage beginning at the shortest range, means separating the readout information into positive, zero, and negative Doppler shift portions, a bank of filters separated in increments of maximum to minimum positive Doppler shift and connected to the positive Doppler shift portions, a second bank of filters separated in increments of minimum to maximum negative Doppler shift and connected to the negative Doppler shift portions, one filter of each bank being responsive to zero Doppler shift and connected to the zero Doppler shift portions, a CRT having sweeps in range, a delay line connecting the output of the banks of filters to the CRT, the maximum positive Doppler shift filter being closest to the CRT and each lesser Doppler shift filter being farther from the CRT with the zero Doppler shift filters being halfway and the maximum negative Doppler shift filter being farthest away so that the first line painted on the CRT shows scatterers at a common range but separated in azimuth by the amount of Doppler shift showing up from the filter banks and delay line, and each succeeding line painted on the CRT is at a greater range until all stored information has been read out and the CRT is painted to the full range desired, and means effecting the repeating of the operation for each $n$ radar pulses.

3. Apparatus for obtaining a picture of terrain over which an aircraft is flying which includes means for sending out isotropically a radar pulse to illuminate terrain to one side of the aircraft, means for picking up the returns from scatterers in the terrain, means for separating the returns into two sets separated in phase, separate means for synchronously demodulating each set of returns against a reference frequency, separate means for storing on a line the output of the synchronous demodulating means, the stored output comprising separate pulses separated in range along the line but mixed so far as Doppler shift characteristics are concerned, means triggering the repetition of the foregoing for $n$ radar pulses to substantially fill the two separate storage means with a series of range separated pulses on parallel storage lines, a separate means for reading out each storage means at right angles to the direction of storage and beginning at the shortest range, a CRT having sweeps progressively increasing in range with each readout sweep, means connected to the output of both readout means and connecting to the CRT for separating the stored pulses in azimuth in response to Doppler shift and for painting scatterers at the sweep range and in proper azimuth on the CRT, and means initiating the storage line by line of a second set of return information from a second series of $n$ radar pulses on each storage means and at right angles to the first set of return information, said second set of information being stored line by line as soon as each line of the storage means is cleared by the reading out means.

4. Apparatus for obtaining a picture of terrain over which an aircraft is flying which includes means for sending out isotropically a radar pulse to illuminate terrain to one side of the aircraft, means for picking up the returns from scatterers in the terrain, means for separating the returns into two sets separated in phase, separate means for converting each set of phase separated returns into two sets of pulses varying in amplitude by the strength of the scatterer return and in rate of change by the Doppler shift characteristics of each scatterer causing the return, separate means for storing on a line the output of the converting means, the stored output comprising separate pulses separated in range along the line but mixed so far as Doppler shift characteristics are concerned, means triggering the repetition of the foregoing for $n$ radar pulses to substantially fill the two separate storage means with a series of range separated pulses on parallel storage lines, a separate means for reading out each storage means at right angles to the direction of storage and beginning at the shortest range, a CRT having sweeps progressively increasing in range with each readout sweep, means connected to the output of both readout means and connecting to the CRT for separating the stored pulses in azimuth in response to Doppler shift and for painting scatterers at the sweep range and in proper azimuth on the CRT, and means initiating the storage line by line of a second set of return information from a second series of $n$ radar pulses on each storage means and at right angles to the first set of return information, said second set of information being stored line by line as soon as each line of the storage means is cleared by the reading out means.

5. Apparatus for obtaining a picture of terrain over which an aircraft is flying which includes means for sending out isotropically a radar pulse to illuminate terrain to one side of the aircraft, means for picking up the returns from scatterers in the terrain, means for separating the returns into two sets separated in phase, separate means for converting each set of phase separated returns into two sets of pulses varying in amplitude by the strength of the scatterer return and in rate of change by the Doppler shift characteristics of each scatterer causing the return, separate means for storing on a line the output of the converting means, the stored output comprising separate pulses separated in range along the line but mixed so far as Doppler shift characteristics are concerned, means triggering the repetition of the foregoing for $n$ radar pulses to substantially fill the two separate storage means with a series of range separated pulses on parallel storage lines, a separate means for reading out each storage means at right angles to the direction of storage and beginning at the shortest range, a CRT having sweeps progressively increasing in range with each readout sweep, means connected to the output of both readout means and connecting to the CRT for separating the stored pulses in azimuth in response to Doppler shift and for painting scatterers at the sweep range and in proper azimuth on the CRT, and means initiating the reoperation of all of the foregoing means for each subsequent series of $n$ radar pulses.

6. Apparatus for obtaining a picture of terrain over which an aircraft is flying which includes means for sending out isotropically a radar pulse to illuminate terrain to one side of the aircraft, means for picking up the returns from scatterers in the terrain, means for splitting the returns into two sets of phase separated returns and for separately storing the two sets in range separated groups, means triggering the foregoing means for one complete series of $n$ radar pulses, a CRT having sweeps progressively changing in range, means for reading out each range separated group of the stored returns for each corresponding range sweep of the CRT and for separating the returns of each range separated groups into returns separated in azimuth by the Doppler shift of each scatterer and for painting them on the CRT, and means for effecting a repetition of the operation of the foregoing means for each successive series of $n$ radar pulses.

7. Apparatus for obtaining a picture of terrain over which an aircraft is flying which includes means on the aircraft for sending out isotropically a radar pulse to illuminate terrain to one side of the aircraft, means for picking up the returns from scatterers on the terrain, means for converting the returns into two complete sets of returns which differ from each other only by a separation in phase, separate means for separately storing each set of returns separated in range, means for repeating the operation of the foregoing means for a series of $n$ radar pulses, separate means beginning at one extreme of range for progressively reading out in a series of different range sweeps the returns from the storage means, means for separating the returns from each read out sweep at a given range into returns separated in azimuth by the Doppler shift of each scatterer, means connected to the output of the last-named means for showing in picture form the scatterers properly separated in range and in azimuth, and means for effecting a repetition of the operation of the foregoing means for a plurality of series of $n$ radar pulses.

8. Apparatus for obtaining a picture of terrain over which a vehicle is moving which includes means on the vehicle for sending out isotropically a wave pulse to illuminate terrain to one side of the vehicle, means for picking up the returns from scatterers on the terrain, means for storing the returns separated in range, means for repeating the operation of the foregoing means for a series of $n$ wave pulses, means beginning at one extreme of range for progressively reading out in a series of different range sweeps the returns from the storage means, means for separating the returns from each read out sweep at a given range into returns separated in azimuth by the Doppler shift of each scatterer, means connected to the output of the last-named means for showing in picture form the scatterers properly separated in range and in azimuth, and means for effecting a repetition of the operation of the foregoing means for a plurality of series on $n$ wave pulses.

References Cited by the Examiner
UNITED STATES PATENTS
2,896,203    7/1959    Wright _____________ 343—7.7

CHESTER L. JUSTUS, *Primary Examiner.*
FRED M. STRADER, *Examiner.*